United States Patent
Inaba et al.

(10) Patent No.: US 11,409,053 B2
(45) Date of Patent: Aug. 9, 2022

(54) OPTICAL CONNECTOR

(71) Applicants: SUMITOMO ELECTRIC OPTIFRONTIER CO., LTD., Yokohama (JP); SUMITOMO ELECTRIC INDUSTRIES, LTD., Osaka (JP)

(72) Inventors: Takahiro Inaba, Kanagawa (JP); Yoshikyo Tamekuni, Kanagawa (JP); Daizo Nishioka, Osaka (JP); Yoshihiro Takeyama, Kanagawa (JP); Mitsumasa Seita, Komaki (JP)

(73) Assignees: SUMITOMO ELECTRIC OPTIFRONTIER CO., LTD., Yokohama (JP); SUMITOMO ELECTRIC INDUSTRIES, LTD., Osaka (JP)

( * ) Notice: Subject to any disclaimer, the term of this patent is extended or adjusted under 35 U.S.C. 154(b) by 17 days.

(21) Appl. No.: 17/150,523

(22) Filed: Jan. 15, 2021

(65) Prior Publication Data
US 2021/0255400 A1 Aug. 19, 2021

(30) Foreign Application Priority Data
Feb. 19, 2020 (JP) .............................. JP2020-026022

(51) Int. Cl.
*G02B 6/38* (2006.01)
(52) U.S. Cl.
CPC ............ *G02B 6/387* (2013.01); *G02B 6/3826* (2013.01); *G02B 6/3874* (2013.01); *G02B 6/3878* (2013.01); *G02B 6/3893* (2013.01)

(58) Field of Classification Search
CPC .... G02B 6/387; G02B 6/3825; G02B 6/3826; G02B 6/3831; G02B 6/3871; G02B 6/3874; G02B 6/3893; G02B 6/3878; G02B 6/3879
See application file for complete search history.

(56) References Cited

U.S. PATENT DOCUMENTS

| | | | |
|---|---|---|---|
| 5,203,718 A * | 4/1993 | Chishima ............. | H01R 13/641 439/350 |
| 6,435,895 B1 * | 8/2002 | Fink ................... | H01R 13/6272 439/352 |
| 6,908,329 B2 * | 6/2005 | Kozono ............... | H01R 13/641 439/352 |

(Continued)

*Primary Examiner* — Ryan A Lepisto
*Assistant Examiner* — Erin D Chiem
(74) *Attorney, Agent, or Firm* — Oliff PLC

(57) ABSTRACT

An optical connector including a housing body having a ferrule, an outer housing, a latch, and a tab is disclosed. The latch extends from a proximal end toward a front end of the optical connector and includes an engaging part at a distal end. The tab is placed on an outer side of the latch, movable with respect to the outer housing, and pushes down the engaging part toward the housing body according to movement of the tab. The distal end of the latch floats to space apart from the housing body. A first protrusion is disposed on an inner side of the tab. The optical connector is configured to contact an inner side of the latch with the first protrusion to push down the engaging part toward the housing body with the first protrusion as a fulcrum when the engaging part is engaged with the external device.

17 Claims, 14 Drawing Sheets

(56) References Cited

U.S. PATENT DOCUMENTS

| | | | |
|---|---|---|---|
| 7,530,838 B2* | 5/2009 | Ohara | H01R 13/7031 |
| | | | 439/752 |
| 7,588,373 B1* | 9/2009 | Sato | G02B 6/3893 |
| | | | 385/59 |
| 7,909,638 B2* | 3/2011 | Seo | H01R 13/6272 |
| | | | 439/352 |
| 7,980,887 B2* | 7/2011 | Urano | H01R 13/639 |
| | | | 439/352 |
| 9,448,370 B2* | 9/2016 | Xue | G02B 6/3893 |
| 9,761,998 B2* | 9/2017 | De Dios Martin | |
| | | | H01R 13/6335 |
| 10,114,180 B2* | 10/2018 | Suzie | G02B 6/3887 |
| 11,002,923 B2* | 5/2021 | Ho | G02B 6/3893 |
| 11,237,342 B2* | 2/2022 | Iizumi | G02B 6/3887 |
| 2010/0255709 A1* | 10/2010 | Tyler | H01R 13/6275 |
| | | | 439/367 |
| 2011/0119904 A1* | 5/2011 | Nishioka | G02B 6/3846 |
| | | | 29/700 |
| 2012/0282791 A1* | 11/2012 | Brown | H01R 13/639 |
| | | | 439/157 |
| 2014/0169727 A1* | 6/2014 | Veatch | G02B 6/2726 |
| | | | 385/11 |
| 2016/0216458 A1* | 7/2016 | Shih | G02B 6/3871 |
| 2016/0327756 A1* | 11/2016 | Raven | G02B 6/3878 |
| 2016/0327757 A1* | 11/2016 | Lee | G02B 6/3869 |
| 2016/0349458 A1* | 12/2016 | Murray | G02B 6/3885 |
| 2018/0341069 A1 | 11/2018 | Takano et al. | |
| 2019/0391343 A1* | 12/2019 | Aoshima | G02B 6/3825 |
| 2021/0281005 A1* | 9/2021 | Taira | H01R 13/506 |

\* cited by examiner

OPTICAL CONNECTOR

CROSS-REFERENCE TO RELATED APPLICATIONS

This application is based upon and claims the benefit of priority from Japanese Patent Application No. 2020-026022, filed on Feb. 19, 2020, the entire contents of which are incorporated herein by reference.

TECHNICAL FIELD

The present disclosure is related to an optical connector.

BACKGROUND

US2018/0341069A discloses an optical connector. The optical connector includes a housing body having a pair of ferrule housings in each of which a ferrule is housed, and a latch having a pair of engaging parts for engaging with an external device such as an adaptor.

SUMMARY

The present disclosure provides an optical connector including a front end and a rear end opposite to the front end in a first direction. The optical connector includes a housing body, an outer housing, a latch, and a tab. The housing body includes at least one ferrule configured to hold an optical fiber therein. The housing body houses the ferrule so that a tip end of the ferrule is exposed at the front end of the optical connector. The outer housing is connected to the housing body. The latch is placed on an outer side of the outer housing and extends in the first direction from a proximal end having a connecting part with the outer housing toward the front end of the optical connector. The latch includes at least one engaging part configured to engage with an external device at a distal end thereof. The distal end of the latch floats to space apart from the housing body in a normal state. The tab is placed on an outer side of the latch to cover at least a part of the latch and connected to the outer housing to be movable in the first direction with respect to the outer housing. The tab is configured to push down the engaging part of the latch toward the housing body in a second direction intersecting the first direction according to movement of the tab in the first direction from the front end toward the rear end. The tab includes at least one first protrusion disposed on an inner side of the tab between the front end of the connector and the proximal end of the latch. The optical connector is configured to contact an inner side of the latch with the first protrusion to push down the engaging part toward the housing body with the first protrusion as a fulcrum when the engaging part of the latch is engaged with the external device.

BRIEF DESCRIPTION OF THE DRAWINGS

The foregoing and other purposes, aspects and advantages will be better understood from the following detailed description of embodiments of the disclosure with reference to the drawings, in which.

DETAILED DESCRIPTION

Figure 1:
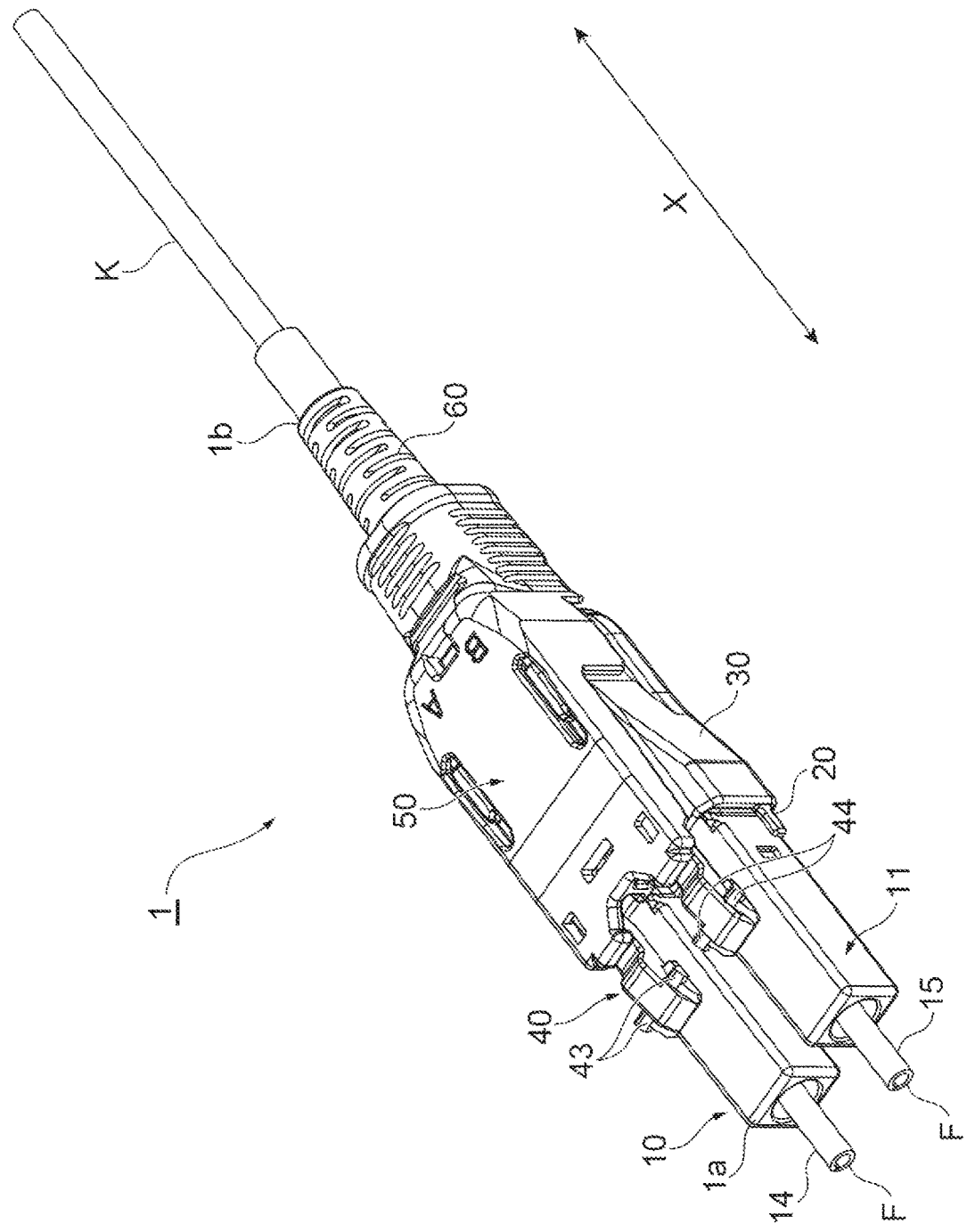
FIG. 1 is a perspective view illustrating an optical connector according to one embodiment.

Problem to be Solved by the Present Disclosure

The optical connector disclosed in US2018/0341069 A is configured such that a distal end of a latch comes into contact with an upper surface of a ferrule housing of a housing body in a normal state before being attached to an adaptor. When an attempt is made to attach the optical connector to the adaptor, a vicinity of an engaging part of the latch is pushed downward by an engaging part of the adaptor. Since a distal end of the latch is supported by the upper surface of the ferrule housing, the engaging part of the latch can be deformed to firmly sink downward when the engaging part of the latch rides over the engaging part of the adaptor. With such a configuration, the above optical connector increases an elastic force at the time of deformation and can provide a desired click feeling to a user. With such a click feeling, the user can intuitively ascertain that the optical connector has been reliably attached to the adaptor.

In work of connecting optical cables to each other using such an optical connector, further weight reduction of the optical connector is desired from a viewpoint of work efficiency. In such a situation, a front portion of the engaging part of the latch of the optical connector disclosed in US2018/0341069A can be used to give a click feeling. However, it is not a portion provided to be used for other purposes. It is desirable to reduce its size from a viewpoint of weight reduction. When this portion is simply reduced in size, it is difficult to give a desired click feeling when the optical connector is attached to the adaptor. Thus, it is desired to provide a user of an optical connector with a desired click feeling when the optical connector is attached to an external device such as an adaptor while achieving weight reduction of the member.

Effect of the Present Disclosure

According to the present disclosure, it is possible to provide an optical connector in which weight reduction thereof can be achieved and a desired click feeling can be given to a user when it is attached to an external device.

Description of Embodiments of the Present Disclosure

Contents of embodiments of the present disclosure will be listed and described. An optical connector according to one embodiment includes a front end and a rear end opposite to the front end in a first direction. The optical connector includes a housing body, an outer housing, a latch, and a tab. The housing body includes at least one ferrule configured to hold an optical fiber therein. The housing body houses the ferrule so that a tip end of the ferrule is exposed at the front end of the optical connector. The outer housing is connected to the housing body. The latch is placed on an outer side of the outer housing and extends in the first direction from a proximal end having a connecting part with the outer housing toward the front end of the optical connector. The latch includes at least one engaging part configured to engage with an external device at a distal end thereof. The distal end of the latch floats to space apart from the housing body in a normal state. The tab is placed on an outer side of the latch to cover at least a part of the latch and connected to the outer housing to be movable in the first direction with respect to the outer housing. The tab is configured to push down the engaging part of the latch toward the housing body in a second direction intersecting the first direction according to movement of the tab in the first direction from the front end toward the rear end. The tab includes at least one first protrusion disposed on an inner side of the tab between the front end of the optical connector and the proximal end of the latch. The optical connector is configured to contact an inner side of the latch with the first protrusion to push down the engaging part toward the housing body with the first protrusion as a fulcrum when the engaging part of the latch is engaged with the external device.

In the above optical connector, the distal end at which the engaging part of the latch is provided floats to spaced apart from the housing body in the normal state. Thus, a region corresponding to a distal end of a conventional latch can be reduced in size to achieve weight reduction of the optical connector. In addition, the first protrusion is disposed on the inner side of the tab between the front end of the optical connector and the proximal end of the latch in this optical connector, and the inner side of the latch comes into contact with the first protrusion and the engaging part of the latch is pushed down toward the housing body with the first protrusion as a fulcrum when the engaging part of the latch is engaged with the external device. According to this configuration, when the engaging part of the latch is engaged with the external device, the latch can be deformed toward the housing body with the first protrusion disposed close to the distal end of the latch with respect to the proximal end thereof as a fulcrum, rather than deforming the latch toward the housing body with the proximal end as a fulcrum. As a result, a deformation distance from the fulcrum decreases, and thus an elastic force of the deformed latch (engaging part) increases and a click feeling when the engaging part of the latch is engaged with the external device can be improved. According to the above optical connector, it is possible to achieve weight reduction of the optical connector and provide a desired click feeling to a user when it is attached to the external device. The term of "normal state" described herein means a state in which the latch is not engaged with an external device including a state before the optical connector is attached to an external device such as an adaptor or a state after the optical connector is detached from an external device.

As one embodiment, the latch and the outer housing may be integrally formed. According to this embodiment, the number of parts of the optical connector can be reduced so as to perform further weight reduction.

As one embodiment, the latch may include a first inclined surface inclined with respect to the first direction on an inner side thereof, and the first inclined surface may space apart from the first protrusion in the normal state and may come into contact with the first protrusion when the engaging part engages with the external device. According to this embodiment, it is possible to prevent the first protrusion from inhibiting an operation of the latch when the optical connector is pulled out from the external device such as an adaptor.

As one embodiment, the latch may include a recess recessed in the second direction and a second inclined surface forming a part of the recess close to the proximal end, on an outer side thereof. The tab may include a second protrusion protruding in the second direction near the front end. The second protrusion of the tab may be positioned in the recess in a state of being spaced apart from an outer surface of the latch in the normal state, and may move along the second inclined surface and push down the engaging part of the latch toward the housing body in the second direction when the tab moves in the first direction from the front end to the rear end. According to this embodiment, an operation at the time of pulling out the optical connector from the external device such as an adaptor can be made smooth.

As one embodiment, a plate thickness of the latch at the proximal end may be thinner than a plate thickness of the latch at a region in which the first inclined surface or the second inclined surface is positioned. According to this embodiment, the operation of the latch with the proximal end as a fulcrum is made smooth, and thus the operation when the optical connector is pulled out from the external device such as an adaptor can be made smooth.

As one embodiment, the housing body may include a pair of front housings each having a ferrule, and an inner housing connected to rear ends of the pair of front housings and housed in the outer housing. The inner housing may be detachably connected to the outer housing. According to this embodiment, the configuration of the optical connector described above can be applied to a pair of optical fibers. In addition, the housing body can be detached from the outer housing.

In the above-described embodiment, the housing body may be configured to be rotatable around a central axis in the first direction at a predetermined angle with respect to the outer housing so that a polarity of the pair of front housings can be changed from a first polarity to a second polarity. Please note that the term of "polarity" means an order in which the two front housings are disposed when the latch is placed upward. Since the polarity of the optical connector can be easily changed in this embodiment, it is possible to make work of the user more efficient. The predetermined angle described herein may include, for example, 180 degrees.

In one embodiment, the optical connector may further include an elastic member disposed between the outer housing and the tab, in which the elastic member may return the tab to the normal state when the tab is moved to the rear end with respect to the outer housing. When the optical connector of this embodiment is pulled out from the adaptor or the like, the pulling-out work can be smoothly performed, and work efficiency can be improved.

Description of Embodiment of Present Disclosure

Specific examples of embodiments of the present disclosure will be described below with reference to the drawings. The present disclosure is not limited to these examples and is defined by the scope of the claims, and meanings equivalent to the scope of the claims and all modifications are intended to be included within the scope. In the following description, the same reference numbers are assigned to the same elements in the description of the drawings, and redundant description thereof will be omitted.

FIG. 1 is a perspective view illustrating an optical connector according to one embodiment. As illustrated in FIG. 1, an optical connector 1 has a shape laterally elongated in a longitudinal direction X (first direction) and includes a front end 1a and a rear end 1b. The rear end 1b is positioned opposite to the front end 1a in the longitudinal direction X. An optical cable K held by the optical connector 1 is inserted from the rear end 1b into the optical connector 1. In the optical connector 1, a pair of optical fibers F enclosed in the optical cable K are housed and held in a pair of ferrules 14 and 15 with coating resins thereof removed. The optical connector 1 may be, for example, a duplex LC connector and an optical connector of a uniboot type.

Figure 2:
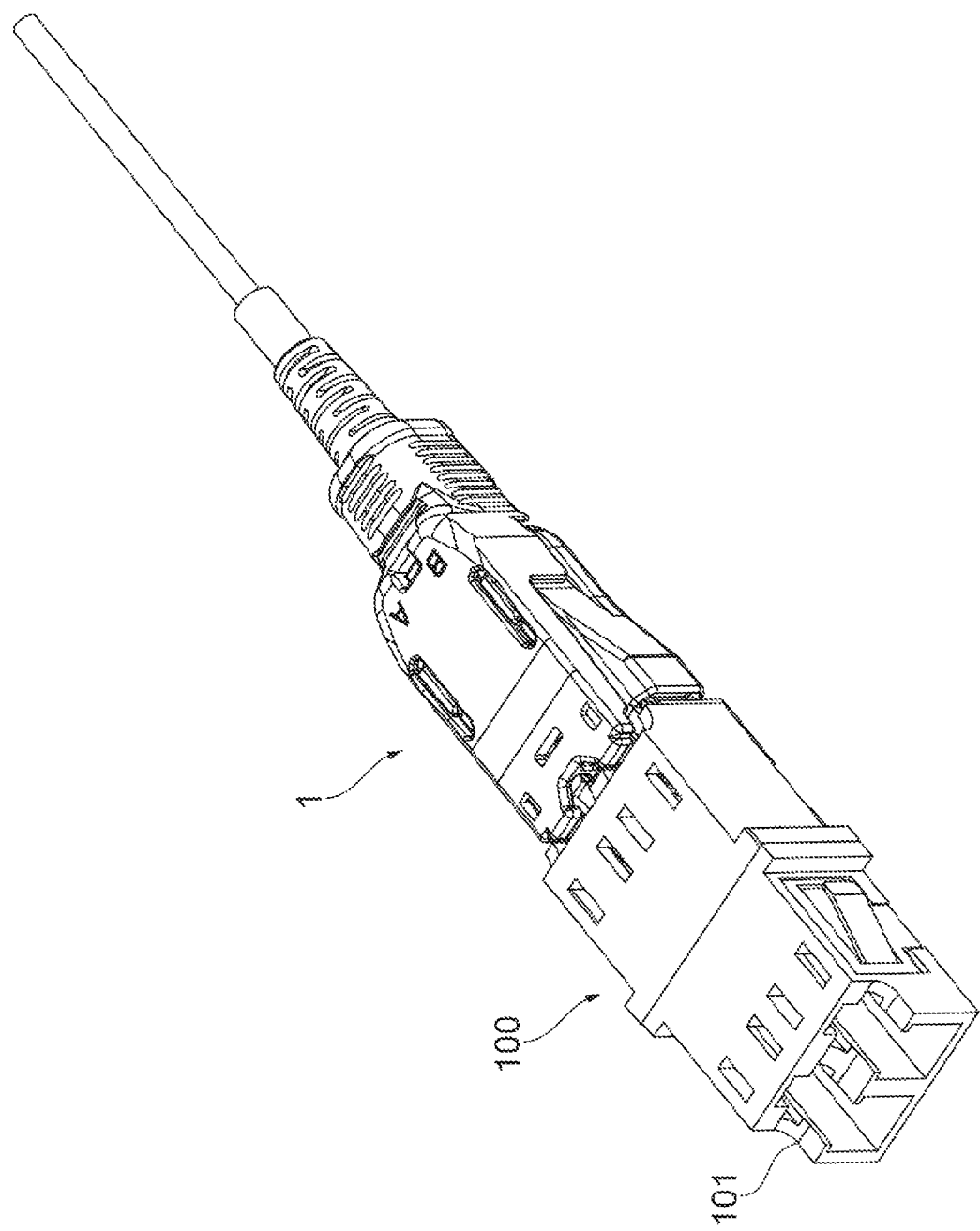
FIG. 2 is a perspective view illustrating a state in which the optical connector illustrated in FIG. 1 is coupled to an adaptor.

FIG. 2 is a view illustrating a state in which the optical connector 1 is inserted into an adaptor 100, which is an external device. As illustrated in FIGS. 1 and 2, engaging parts 43 and 44 provided at a distal end of a latch 40 (details will be described below) engage with an engaging part provided in the adaptor 100, and then the optical connector 1 is housed in a predetermined position in the adaptor 100 and locked to the adaptor 100. Another optical connector is inserted into a mounting port 101 of the adaptor 100 opposite to the optical connector 1, and the optical connector 1 is optically coupled to another optical connector by the adaptor 100. Another optical connector may have a same configuration as the optical connector 1 or have a different configuration. The optical connector 1 may be configured to be inserted into a connecting part such as an optical transceiver serving as an external device.

Figure 3:
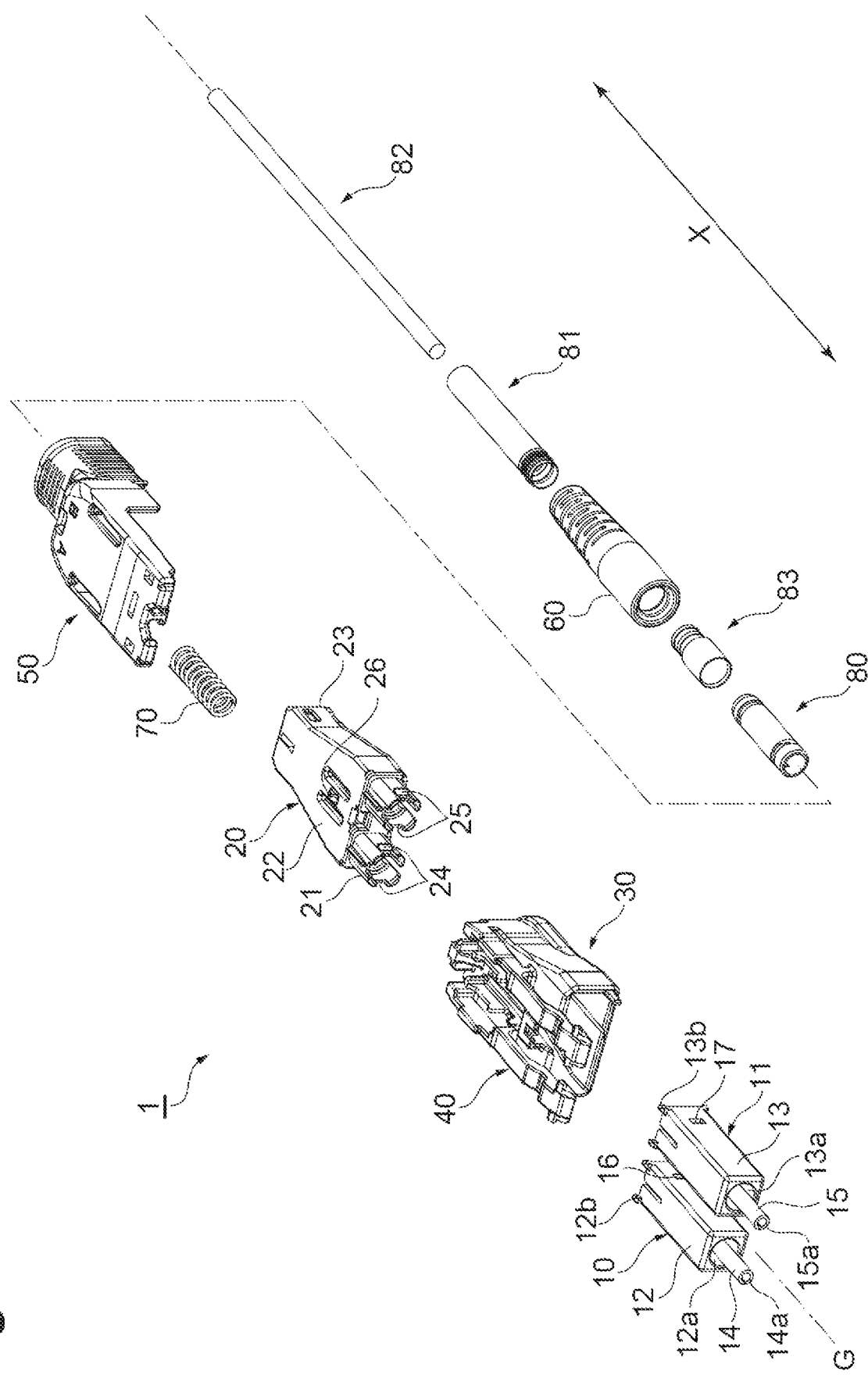
FIG. 3 is an exploded perspective view of the optical connector illustrated in FIG. 1.

FIG. 3 is an exploded perspective view of the optical connector 1 illustrated in FIG. 1. As illustrated in FIGS. 1 and 3, the optical connector 1 includes a pair of front housings 10 and 11, an inner housing 20, an outer housing 30, the latch 40, a tab 50, a boot 60, an elastic member 70, and cable holding members 80, 81, 82 and 83. In the present embodiment, a housing body M (see FIGS. 11 and 12) may be constituted by the pair of front housings 10 and 11 and the inner housing 20.

Figure 11:
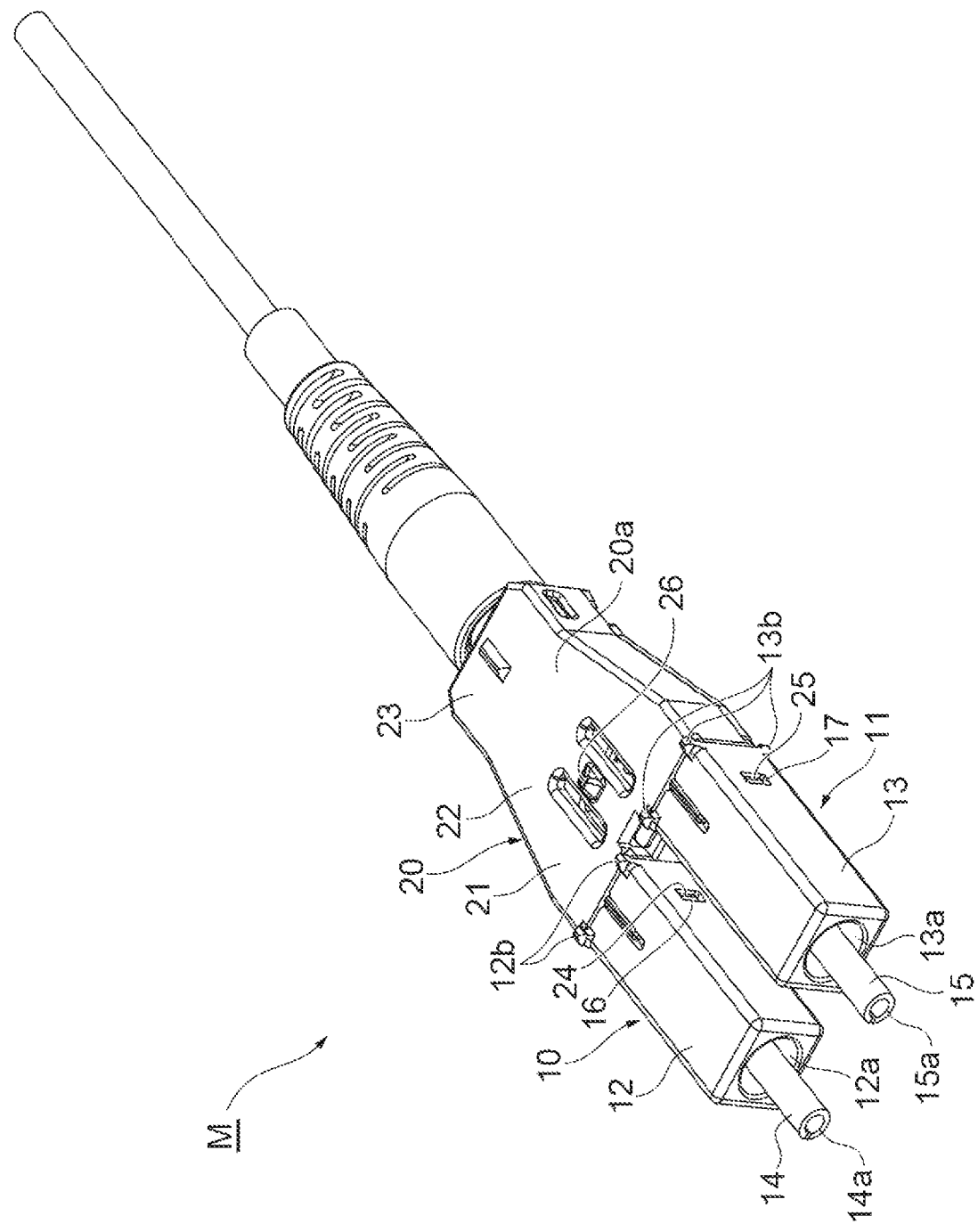
FIG. 11 is a perspective view illustrating a housing body which constitutes a part of the optical connector.

The front housing 10 includes a main body 12 and a ferrule 14, and the front housing 11 includes a main body 13 and a ferrule 15 (see also FIG. 11). The main bodies 12 and 13 are formed of a synthetic resin and have an outer shape of a square column in which round holes 12a and 13a are provided, respectively. The main body 12 houses the ferrule 14 that holds the optical fiber F in the round holes 12a so that distal ends 14a of the ferrule 14 is exposed to the outside at the front end 1a of the optical connector 1. The main body 13 houses the ferrule 15 that holds the optical fiber F in the round holes 13a so that distal ends 15a of the ferrule 15 is exposed to the outside at the front end 1a of the optical connector 1. Distal ends of the held optical fibers F are exposed from the distal ends 14a and 15a of the ferrules 14 and 15, respectively. The distal ends 14a and 15a of the ferrules 14 and 15 may be surfaces parallel to a vertical direction perpendicular to (intersecting) the longitudinal direction or may be inclined surfaces to the vertical direction. Four protrusions 12b and four protrusion 13b are provided at four corners of each of rear ends of the main bodies 12 and 13. The protrusions 12b and 13b define a mutual positional relationship when the front housings 10 and 11 are connected to a front end of the inner housing 20. A pair of openings 16 having a rectangular shape are provided on both lateral surfaces of the front housing 10, and a pair of openings 17 having a rectangular shape are provided on both lateral surfaces of the front housing 11.

The inner housing 20 is a housing in which a space is formed to house an optical fiber therein and is formed of a synthetic resin. The inner housing 20 includes a front end portion 21, a tapered portion 22, and a rear end portion 23, and is formed so that an internal space thereof gradually enlarges from the rear end toward the front end. The inner housing 20 is a member for branching the pair of optical fibers F enclosed in the optical cable K into the ferrules 14 and 15 and is connected to rear ends of the pair of front housings 10 and 11. A pair of latches 24 and a pair of latches 25 are provided in the front end portion 21 of the inner housing 20. The pair of latches 24 are inserted into and engaged with the pair of openings 16 of the front housing 10 from the inside, and the pair of latches 25 are inserted into and engaged with the pair of openings 17 of the front housing 11 from the inside. Thereby, the pair of front housings 10 and 11 are connected to the inner housing 20. In addition, protrusions 26 and 27 are provided on the inner housing 20 near the front end portion 21 and at centers of surfaces 20a and 20b, respectively (see FIGS. 11 and 12). When the inner housing 20 is housed in the outer housing 30, either one of the protrusions 26 or 27 engages with a hole 38 (see FIG. 14) provided in a lower surface 30b of the outer housing 30, and thereby the inner housing 20 is detachably connected to the inside of the outer housing 30. Each of the protrusions 26 and 27 has an inclined surface to be attachable and detachable.

Figure 4:
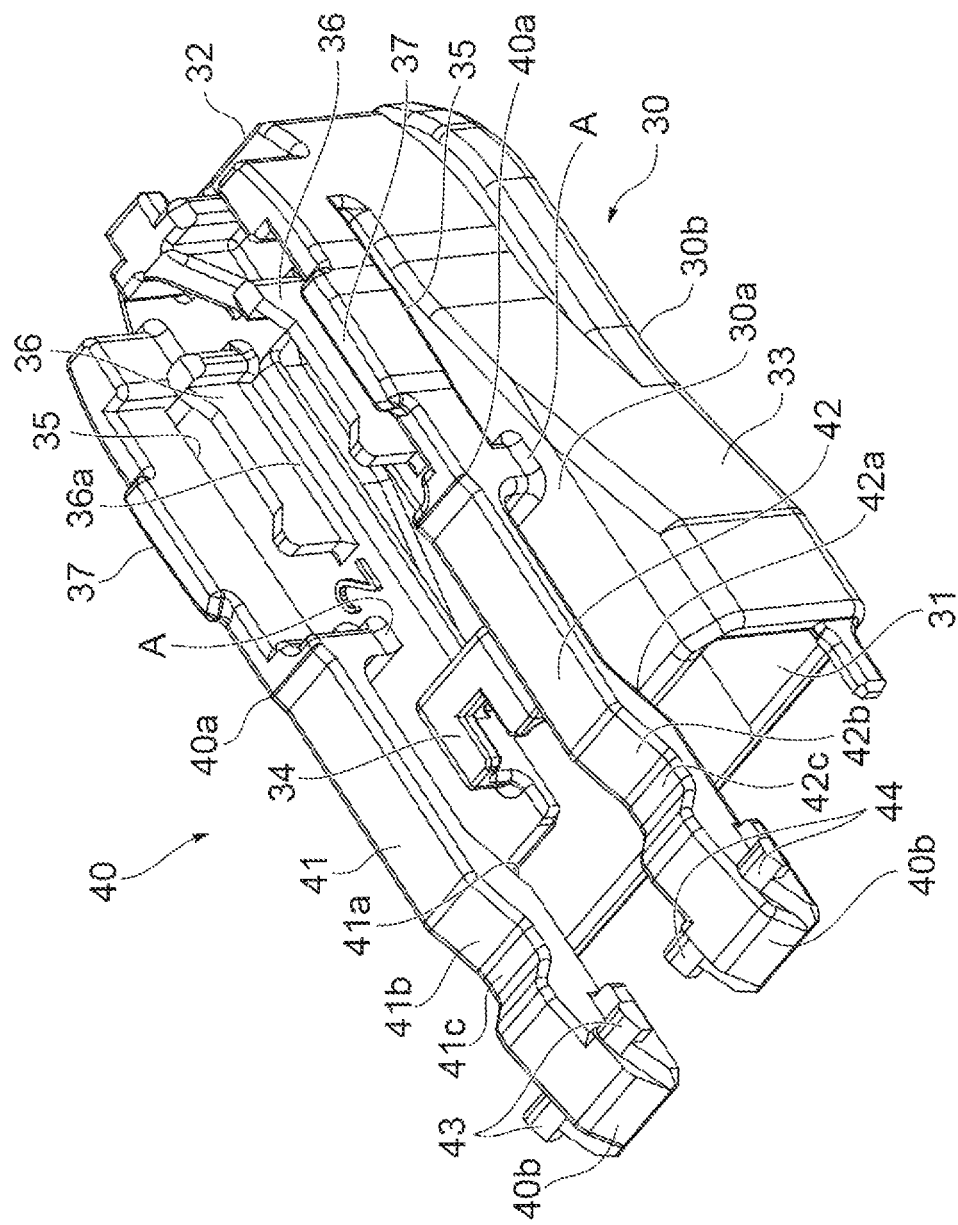
FIG. 4 is a perspective view illustrating an outer housing with a latch attached which is one component of the optical connector.

The outer housing 30 is a housing that houses the inner housing 20 therein to be connected to the inner housing 20. FIG. 4 is a perspective view illustrating the outer housing 30. As illustrated in FIG. 4, the outer housing 30 of the present embodiment is formed of a synthetic resin to be integrated with the latch 40 to be described below. The outer housing 30 and the latch 40 may be formed as separate bodies and connected to each other by a method, such as adhesion, fitting, or the like, as an example. In FIG. 4, the latch 40 is connected to the outer housing 30 at a pair of connecting parts A. As illustrated in FIG. 4, the outer housing 30 includes a housing body 33 having openings 31 and 32 at the front and the rear, respectively.

A pair of walls 36 defining a portion 36a for housing the elastic member 70 therein and a pair of guide protrusions 37 positioned on respective outer sides of the respective walls 36 are provided on an upper surface 30a of the outer housing 30. The elastic member 70 housed in the portion 36a is disposed between the outer housing 30 and the tab 50 to be described below (see FIG. 10) and functions to return the tab 50 to a normal position when the tab 50 moves toward the rear end 1b with respect to the outer housing 30. The elastic member 70 may be, for example, a spring. The pair of guide protrusions 37 are positioned in a pair of slits 55 and 56 of the tab 50, respectively when the tab 50 is connected to the outer housing 30 to guide movement of the tab 50 in the longitudinal direction X. The outer housing 30 further includes, as a structure connecting to the tab 50, a protruding part 34 provided on a front side and a pair of slits 35 for connection provided on a lower side of each of the guide protrusions 37. The hole 38 and an opening 39 are provided in the lower surface 30b of the outer housing 30 (see FIG. 14). The protrusion 26 or 27 of the inner housing 20 enters the hole 38, and thereby the inner housing 20 is detachably connected to the outer housing 30.

The latch 40 is a member that is provided on an outer side of the outer housing 30. The latch 40 includes elongate members 41 and 42 each extending in the longitudinal direction X from each proximal end 40a having the connecting part A toward the front end 1a. The elongate member 41 includes the engaging part 43, and the elongate member 42 includes the engaging part 44. Both of the engaging parts 43 and 44 are engageable with an external device such as the adaptor 100 at distal end portions 40b thereof. Each of the engaging parts 43 and 44 is configured to include a pair of protrusions each protruding, for example, in an outward direction perpendicular to the longitudinal direction X. When these protrusions of the engaging parts 43 and 44 are engaged with an engaging part in the adaptor 100, the optical connector 1 is attached to the adaptor 100. The distal ends 40b of the latch 40, that is, the engaging parts 43 and 44, are in a state of floating to space apart from the front housings 10 and 11 in a normal state.

Figure 7:
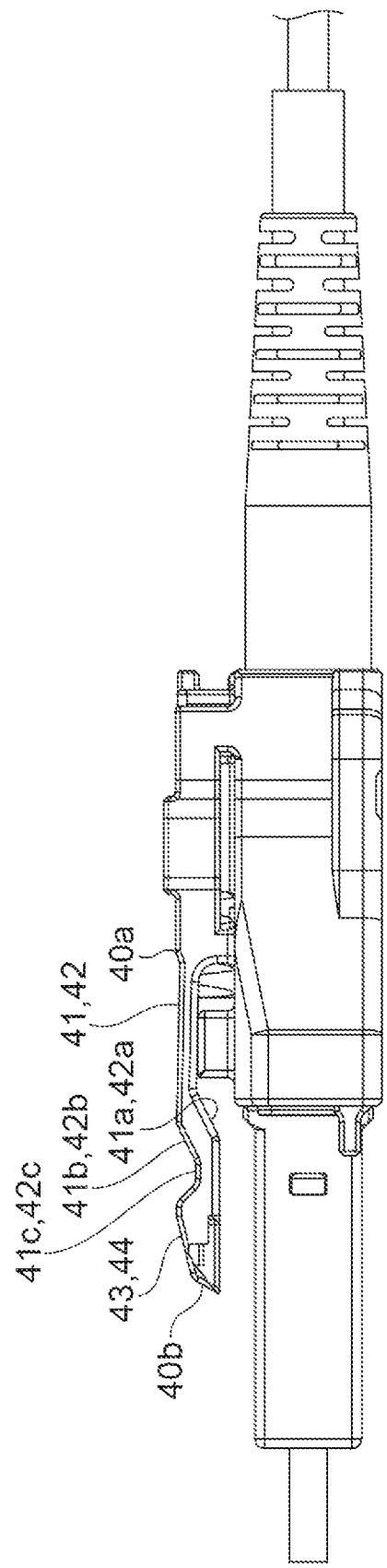
FIG. 7 is a side view of a configuration of the optical connector in which the tab is removed from the optical connector.

First inclined surfaces 41a and 42a, second inclined surfaces 41b and 42b, and recesses 41c and 42c are provided in the elongate members 41 and 42 of the latch 40 in the vicinity of centers thereof (see also FIG. 7). The first inclined surfaces 41a and 42a are provided on an inner side of the latch 40. The second inclined surfaces 41b and 42b are provided on an outer side of the latch 40 and form a part of the recesses 41c and 42c, respectively. The elongate members 41 and 42 may be formed to have the same thickness throughout, or a plate thickness of the proximal end 40a may be thinner than a plate thickness at a region in which the first inclined surfaces 41a and 42a or the second inclined surface 41b and 42b are positioned. In this case, movement of the distal ends 40b of the latch 40, that is, the engaging parts 43 and 44, in the vertical direction with the respective proximal ends 40a as respective fulcrums becomes smoother. The term of "plate thickness" mentioned herein means a thickness in a direction perpendicular to a surface at each portion.

Figure 5:
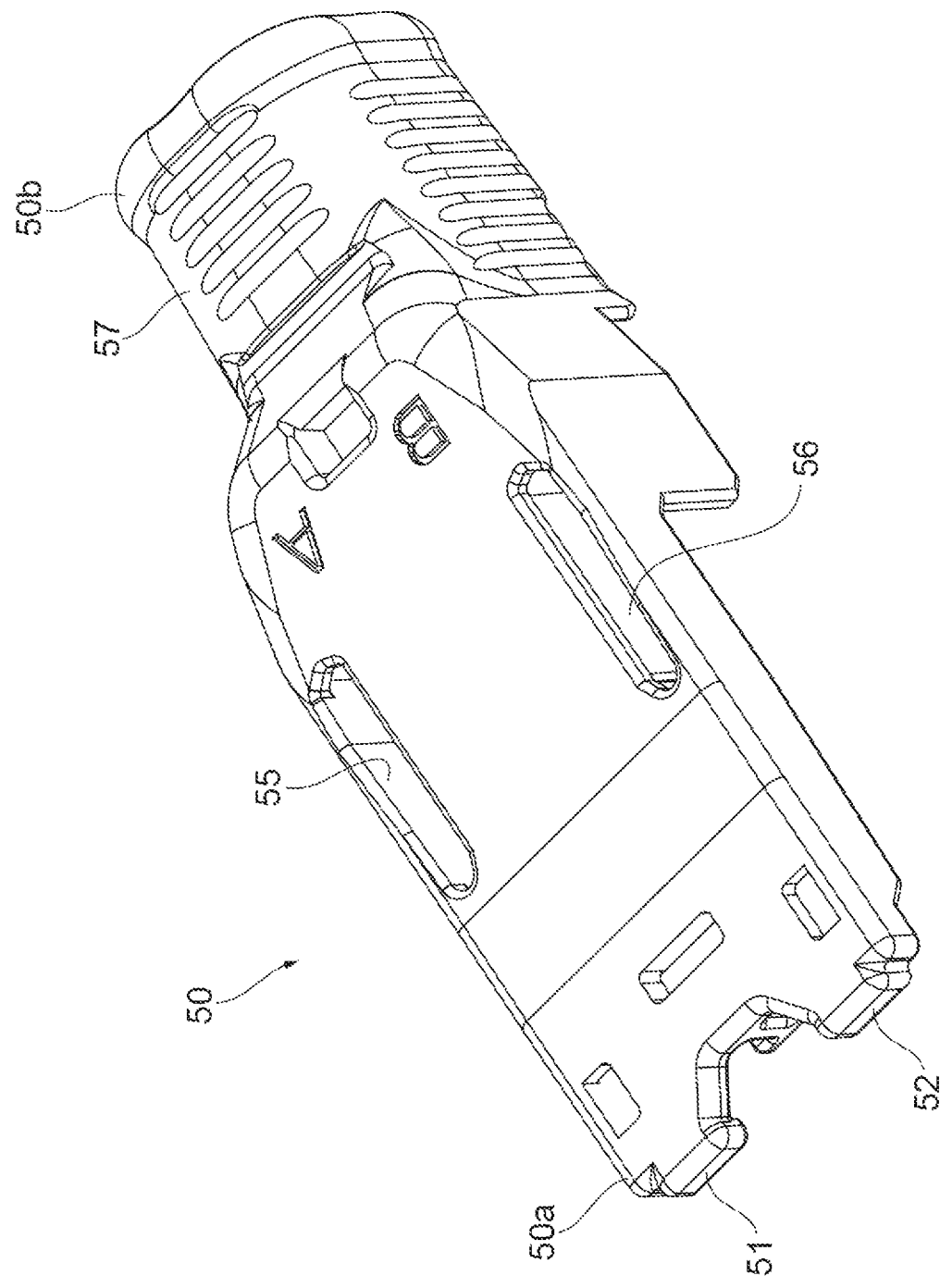
FIG. 5 is a perspective view illustrating a tab which is one component of the optical connector.
Figure 6:
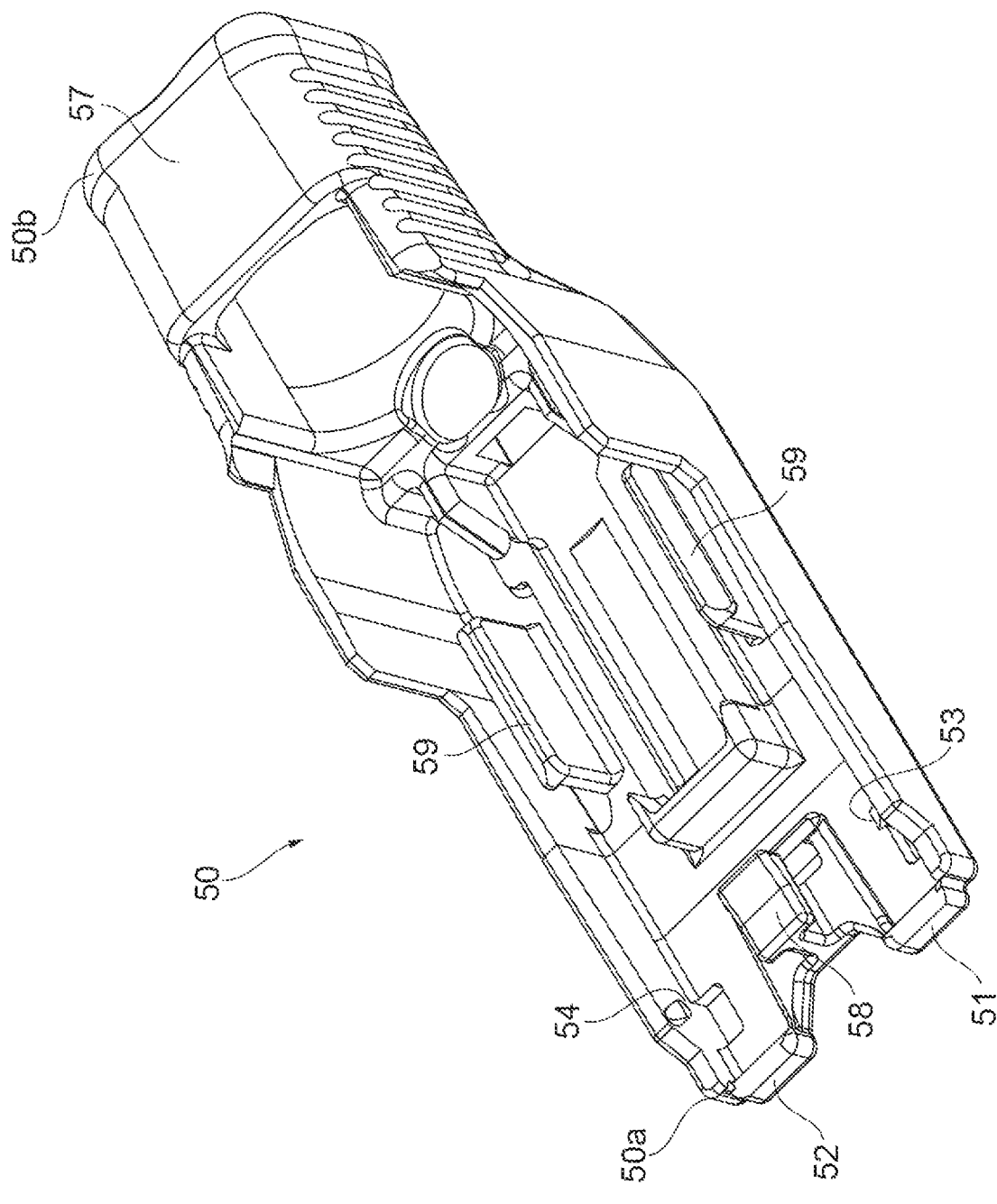
FIG. 6 is a perspective view of the tab illustrated in FIG. 5 from the opposite side.

The tab 50 is disposed on an outer side of the latch 40 to cover a portion of the latch 40 excluding the distal end 40b. FIG. 5 is a perspective view illustrating the tab 50 from one side, and FIG. 6 is a perspective view illustrating the tab 50 from the other side. As illustrated in FIGS. 3, 4, 5 and 6, a protruding part 58 on an inner side of a front end 50a of the tab 50 is connected to the protruding part 34 on the upper surface 30a of the outer housing 30, and a pair of left and right latches 59 on an inner side of the tab 50 are caught by the left and right slits 35 of the upper surface 30a of the outer housing 30 from the inside. Thereby, the tab 50 is connected to the outer housing 30 to be movable in the longitudinal direction with respect to the outer housing 30. The tab 50 is configured to push down the engaging parts 43 and 44 of the latch 40 toward the front housings 10 and 11 in the vertical direction perpendicular to (intersecting) the longitudinal direction according to movement thereof in the longitudinal direction from the front end 1a toward the rear end 1b. More specifically, protrusions 51 and 52 protruding downward are provided at the front end 50a of the tab 50, the protrusions 51 and 52 move rearward along the second inclined surfaces 41b and 42b of the latch 40 when the tab 50 moves rearward, and thereby the engaging parts 43 and 44 of the latch 40 are pushed downward for releasing the optical connector 1 from the adapter 100.

A pair of protrusions 53 and 54 are further provided on an inner side of the tab 50. The protrusions 53 and 54 are provided at positions at which they are almost, but not in contact with the inner side of the latch 40 in the normal state. However, the protrusions 53 and 54 are configured to come into contact with the inner side of the latch 40 when the engaging parts 43 and 44 of the latch 40 move slightly downward at the time of the optical connector 1 being attached to the adaptor 100, that is, at the time of the engaging parts 43 and 44 of the latch 40 being engaged with an engaging part of the adaptor 100. Then, the latch 40 is configured such that the engaging parts 43 and 44 are pushed down toward the front housings 10 and 11 with contact points of the latch 40 with the protrusions 53 and 54 as respective fulcrums.

The pair of slits 55 and 56 are provided in a central portion of the tab 50. The pair of guide protrusions 37 of the outer housing 30 described above are disposed in the slits 55 and 56, respectively. When the pair of guide protrusions 37 slide in the slits 55 and 56, movement of the tab 50 in the longitudinal direction is guided. A grip part 57 is provided at a rear end 50b of the tab 50. When the optical connector 1 attached to the adaptor 100 is detached from the adaptor 100, a user grips the grip part 57 and pulls the tab 50 rearward, and thereby the protrusions 51 and 52 perform the above-described operation and engagement of the latch 40 is released. The grip part 57 in the present embodiment has a cylindrical shape that makes one revolution so that the user can grip in both the vertical direction and the lateral direction, but the grip part 57 may have a configuration in which it can be gripped in at least one of the vertical direction and the lateral direction. The boot 60 to be described below is housed inside the grip part 57.

The boot 60 and the cable holding members 80 to 82 are members for introducing the optical cable K into the optical connector 1 and fixing the optical cable K at a predetermined position in the optical connector 1. A part of the boot 60 and the cable holding members 80 to 82 are housed inside the outer housing 30 or the like.

Figure 8:
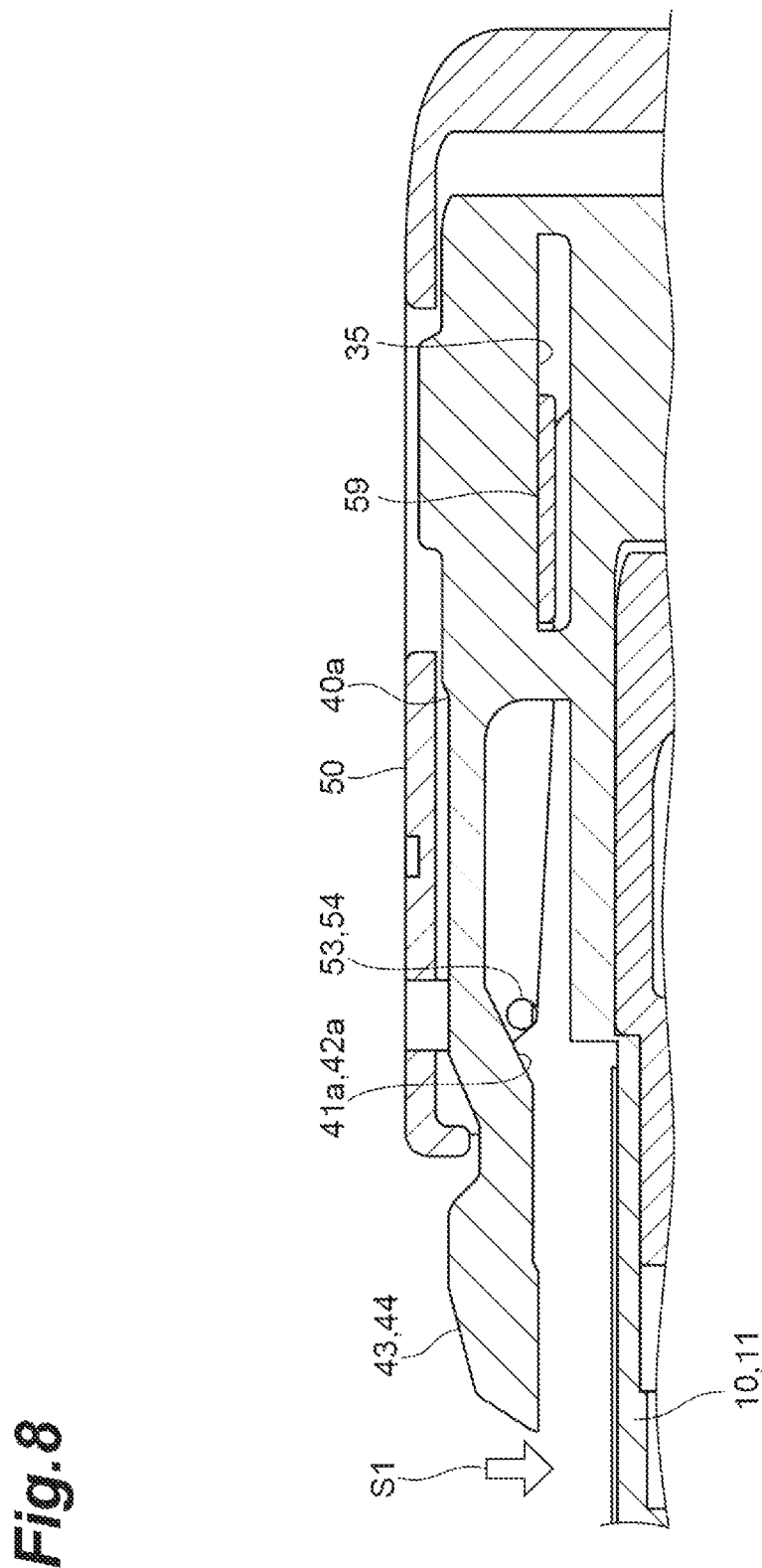
FIG. 8 is an enlarged cross-sectional view of an upper portion of the optical connector and is a cross-sectional view illustrating an operation when the optical connector is inserted into the adaptor.

Next, an operation of the optical connector 1 having the above-described configuration when the optical connector 1 is attached to the adaptor 100 will be described with reference to FIGS. 7 and 8. FIG. 7 is a side view of a configuration of the optical connector 1 in which the tab 50 is removed from the optical connector 1. FIG. 8 is an enlarged cross-sectional view of an upper portion of the optical connector 1 and is a cross-sectional view illustrating an internal operation when the optical connector 1 is inserted into the adaptor 100. As illustrated in FIGS. 7 and 8, in the optical connector 1 in the normal state before being attached to the adaptor 100, the protrusions 53 and 54 provided inside the tab 50 are positioned slightly away from the first inclined surfaces 41a and 42a of the latch 40. When the optical connector 1 is inserted into the adaptor 100, the engaging parts 43 and 44 are slightly pushed down by the engaging part of the adaptor 100 in a direction of arrow S1. A fulcrum of an operation of the latch 40 at this time is positioned at the proximal end 40a. This operation causes the first inclined surfaces 41a and 42a of the latch 40 to come into contact with the protrusions 53 and 54.

Thereafter, when the engaging parts 43 and 44 are pushed further downward (in the direction of arrow S1) by the engaging part of the adaptor 100, the latch 40 (the engaging parts 43 and 44) is pushed downward with its contact points with the protrusions 53 and 54 as respective fulcrums. That is, the fulcrum has moved to a position closer to a point at which a load is applied to the latch 40. Thus, the latch 40 is deformed with this near fulcrum as a center, and an elastic force of the latch 40 that has become stronger is fed back to the user. As a result, a click feeling can be improved when the optical connector 1 is inserted into the adaptor 100 and engagement of the engaging parts are completed with each other.

Figure 9:
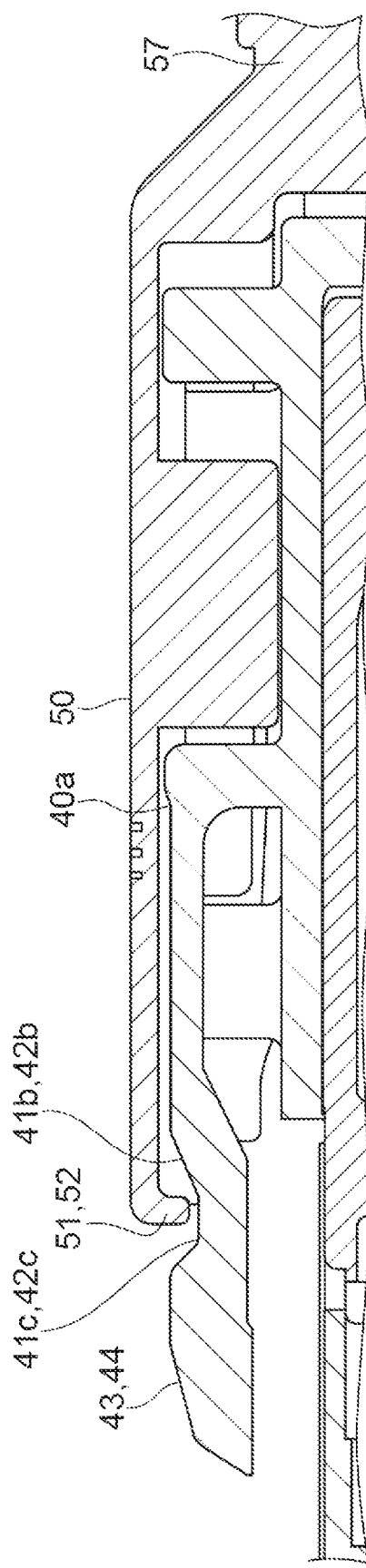
FIG. 9 is an enlarged cross-sectional view of the upper portion of the optical connector.
Figure 10:
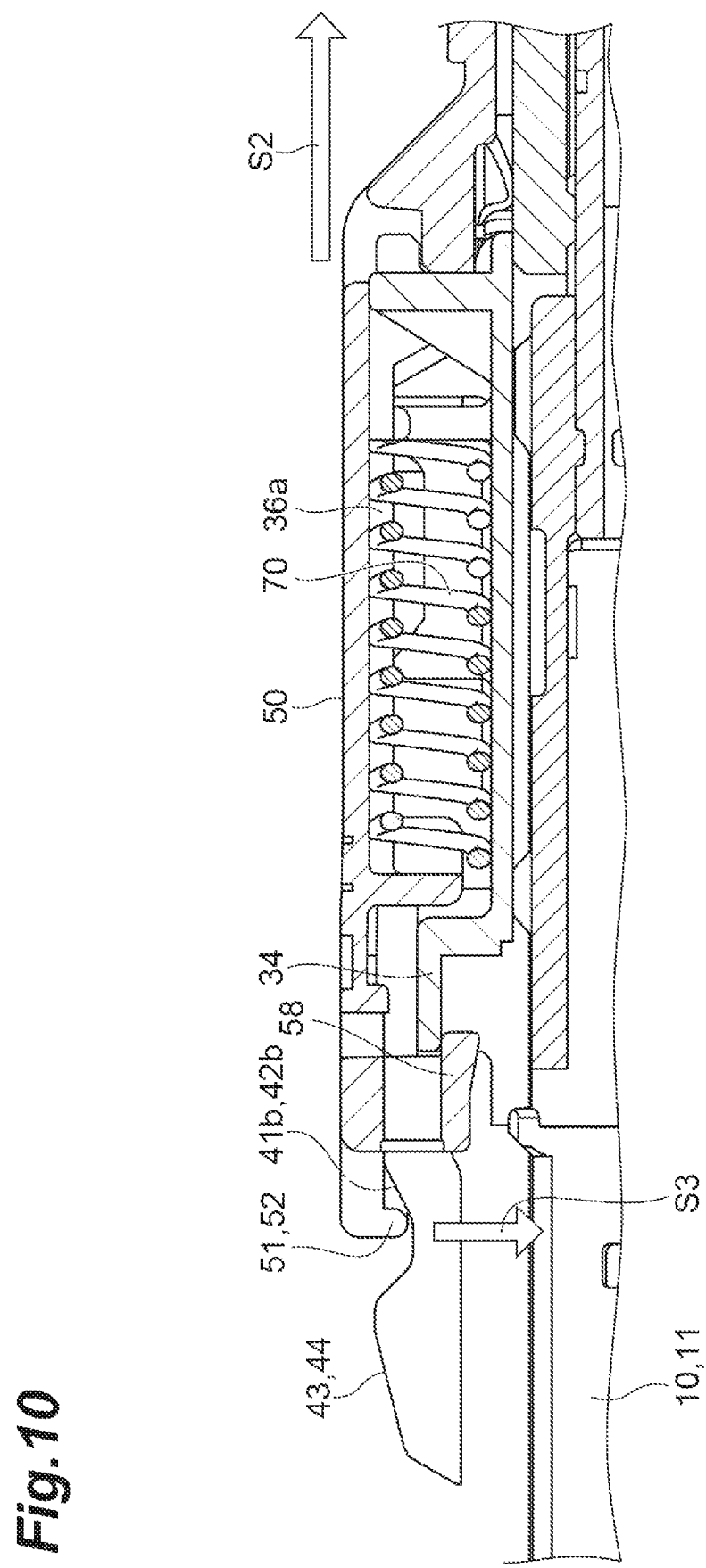
FIG. 10 is an enlarged cross-sectional view of the upper portion of the optical connector and is a cross-sectional view illustrating an operation when the optical connector is pulled out from the adaptor.

Next, an operation when the optical connector 1 is detached from the adaptor 100 will be described with reference to FIGS. 9 and 10. FIG. 9 is an enlarged cross-sectional view of the upper portion of the optical connector 1 and illustrates a state of being attached to the adaptor 100. FIG. 10 is a cross-sectional view illustrating an operation when the optical connector 1 is pulled out from the adaptor 100. As illustrated in FIGS. 9 and 10, when the optical connector 1 is detached from the adaptor 100, the user grips the grip part 57 of the tab 50 and pulls the tab 50 in a direction of arrow S2 (rearward). Due to this operation, the tab 50 moves rearward, and the protrusions 51 and 52 at a distal end of the tab 50 come into contact with the second inclined surfaces 41b and 42b of the latch 40, move rearward along the second inclined surfaces 41b and 42b, and push the engaging parts 43 and 44 downward, that is, in a direction toward the front housings 10 and 11 (direction of arrow S3). As a result, the optical connector 1 is pulled out from the adaptor 100. At this time, the latch 40 performs the operation with the proximal end 40a as a fulcrum. The tab 50 that has moved rearward is automatically returned to an initial position which is the normal state by the spring which is the elastic member 70 disposed between the outer housing 30 and the tab 50.

Figure 12:
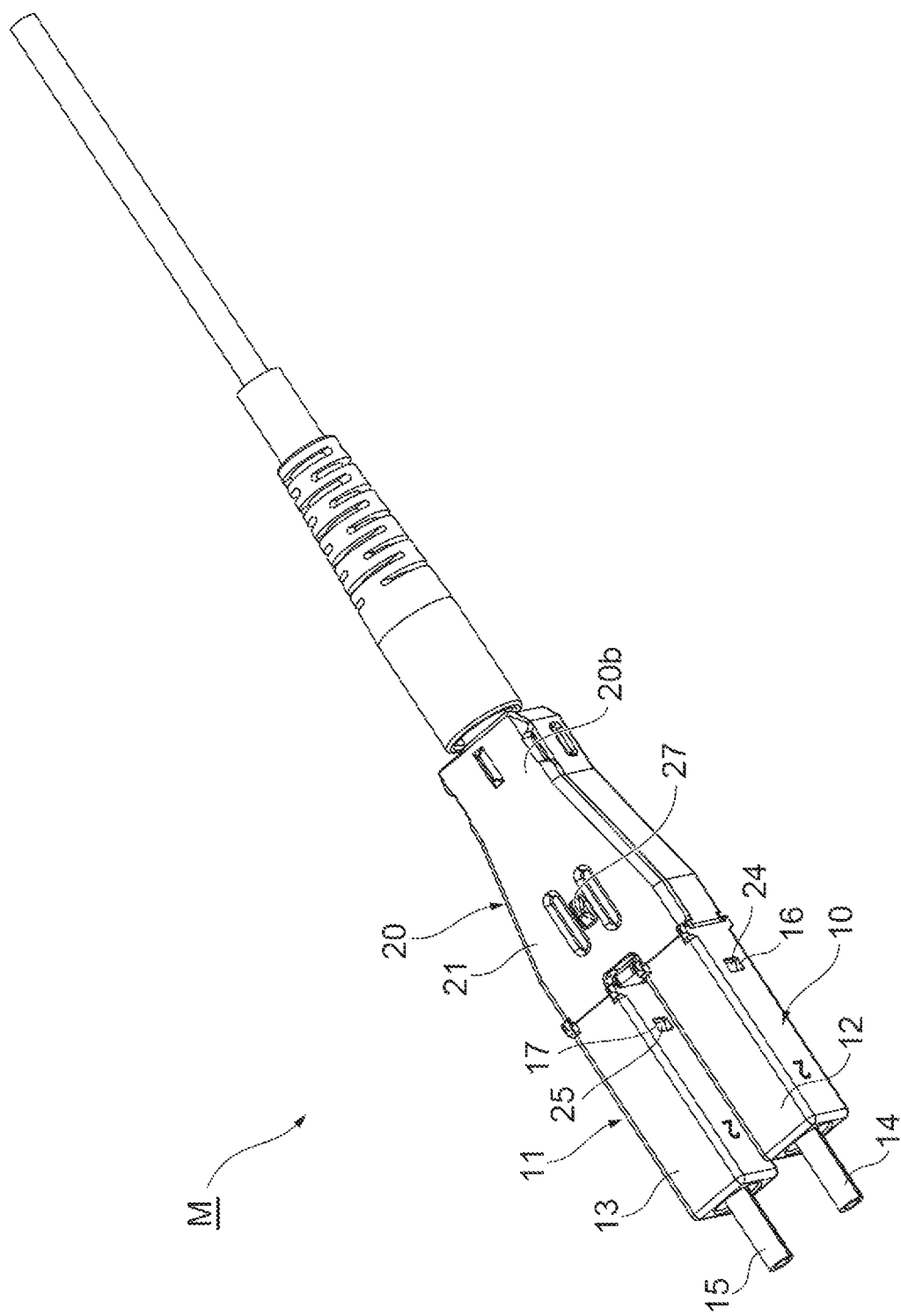
FIG. 12 is a perspective view illustrating a state of viewing the housing body illustrated in FIG. 11 from the opposite side.
Figure 13A:
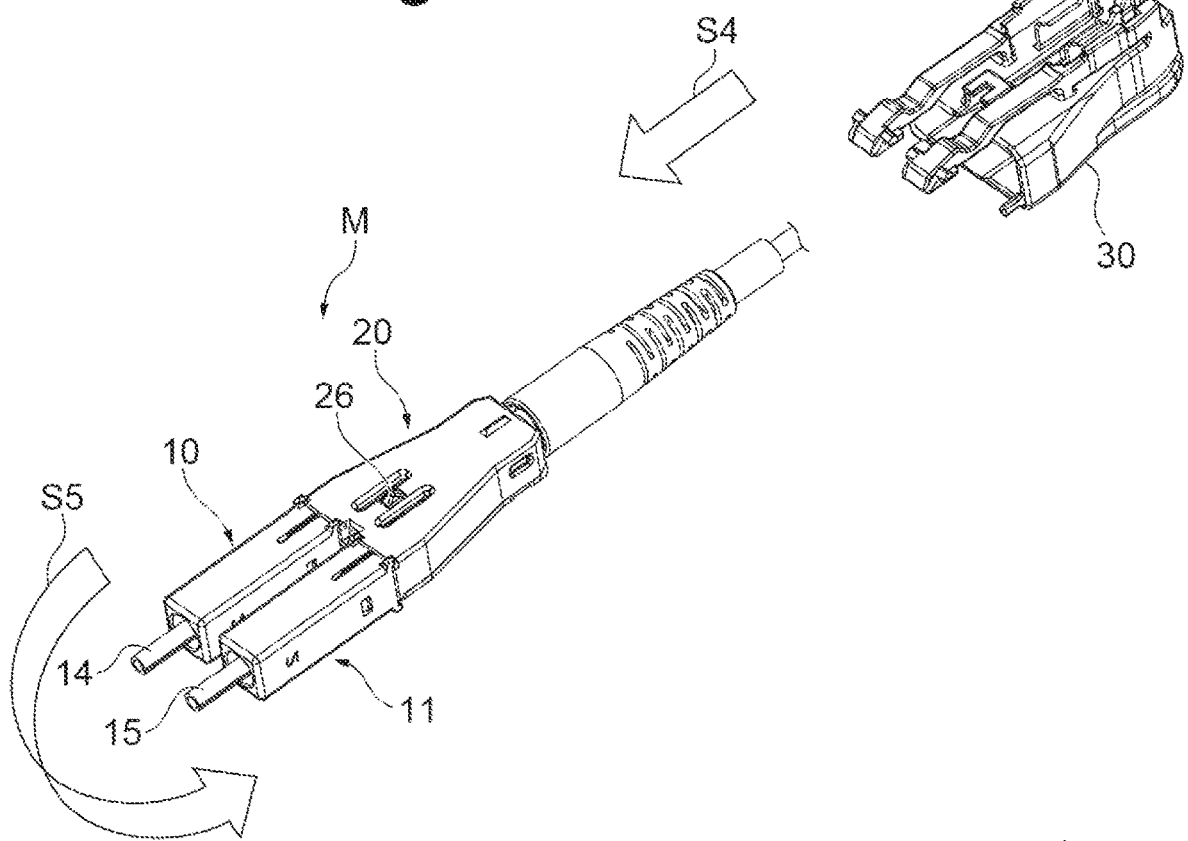
FIGS. 13A and 13B are views sequentially illustrating an operation for changing a polarity of the housing body illustrated in FIGS. 11 and 12.
Figure 13B:
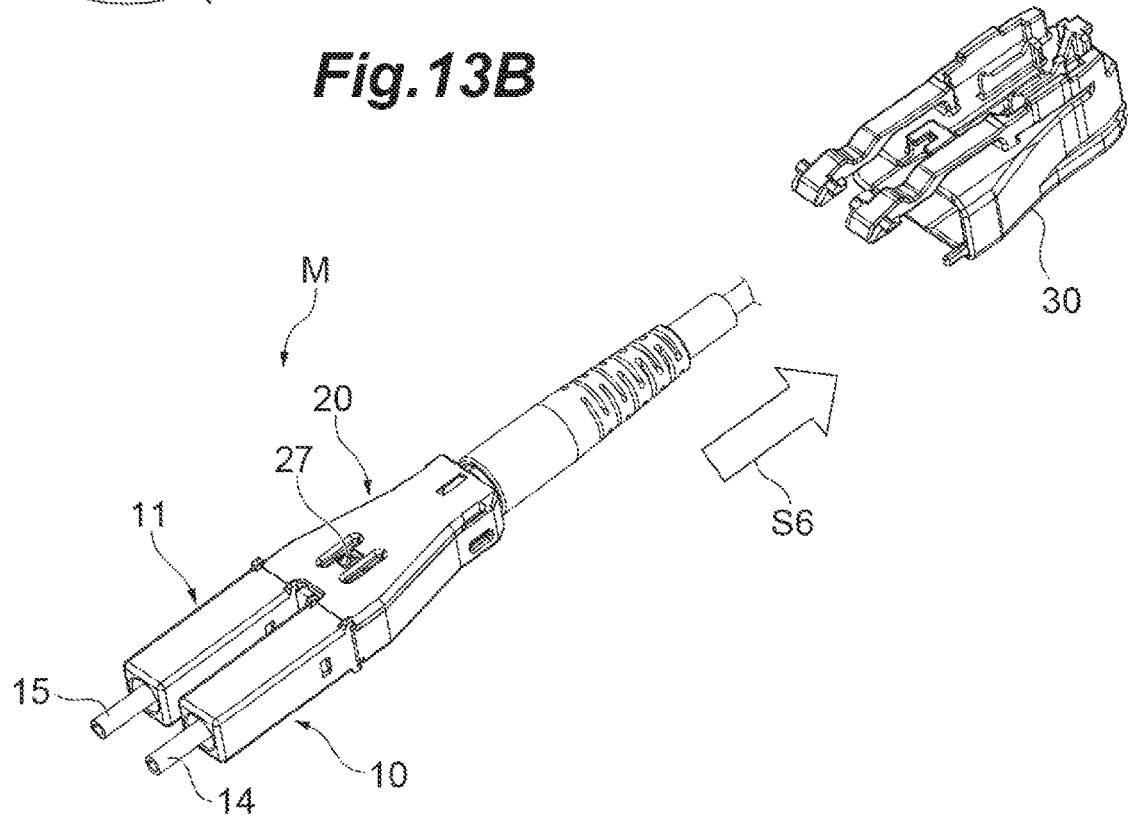
Figure 14:
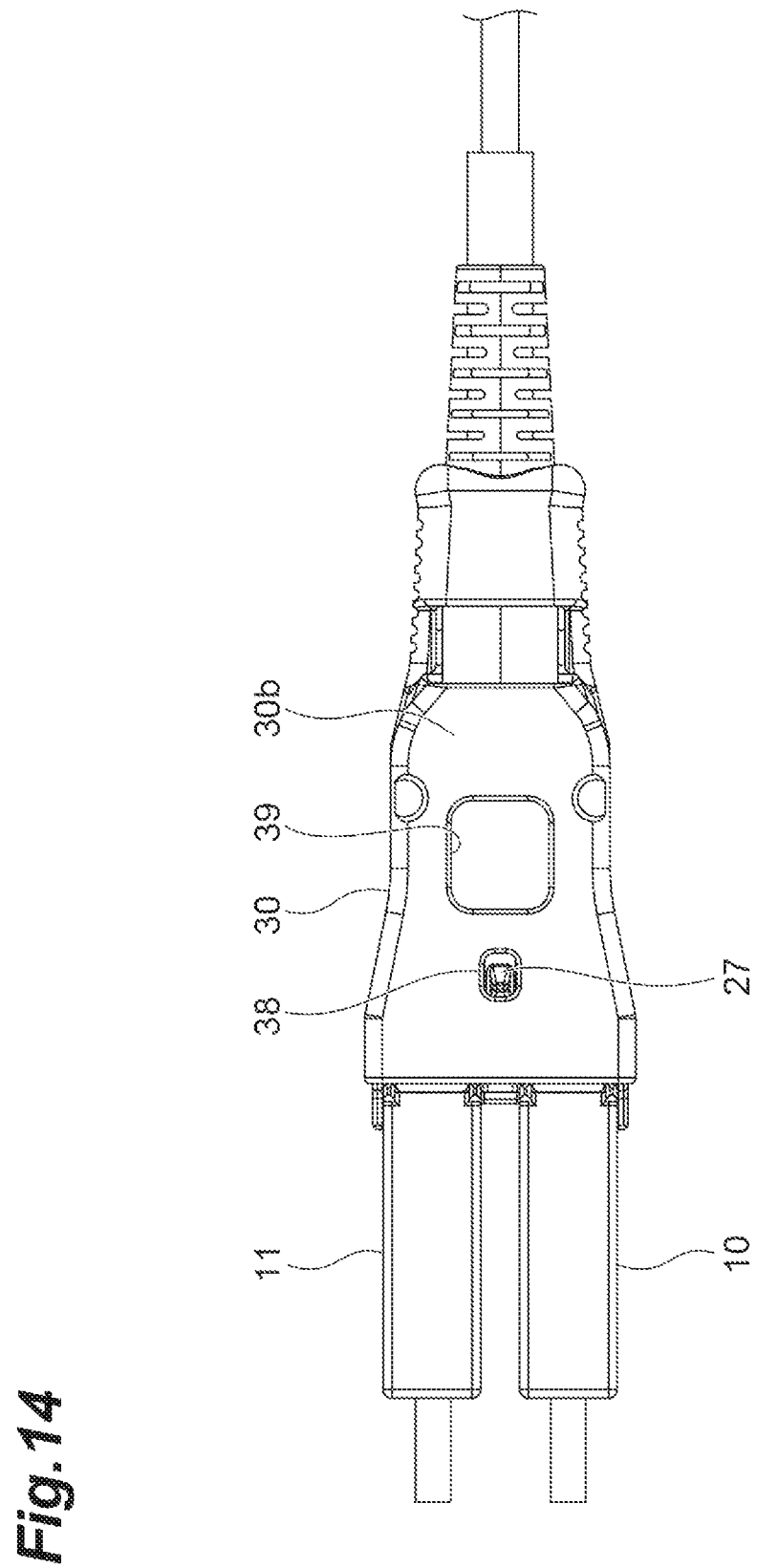
FIG. 14 is a plan view illustrating a state in which the housing body illustrated in FIGS. 11 and 12 is housed in the outer housing.

Next, an operation for changing a polarity of the optical fibers held by the pair of ferrules 14 and 15 in the optical connector 1 will be described with reference to FIGS. 11 to 14. FIG. 11 is a perspective view illustrating the housing body which constitutes a part of the optical connector. FIG. 12 is a perspective view illustrating a state of viewing the housing body illustrated in FIG. 11 from the opposite side. FIGS. 13A and 13B are views sequentially illustrating an operation for changing a polarity of the housing body illustrated in FIGS. 11 and 12. FIG. 14 is a plan view illustrating a state in which the housing body illustrated in FIGS. 11 and 12 is housed in the outer housing 30. The housing body M is configured to include the front housings 10 and 11 and the inner housing 20. The term of "polarity" means an order in which the two front housings 10 and 11 are disposed when the latch 40 is placed upward.

As illustrated in FIGS. 11 and 12, the optical connector 1 includes the pair of ferrules 14 and 15 each housing an optical fiber F. In a connection work of the optical connector 1, not only a case in which it is desired to be connected to the adaptor 100 with a first polarity illustrated in FIG. 11 without change, there is also a case in which the polarity is changed (for example, left and right positions of a transmitting optical fiber and a receiving optical fiber are reversed with respect to a position of the latch 40) and it is desired to be connected to the adaptor 100 with a second polarity illustrated in FIG. 12. As illustrated in FIG. 13A, the housing body M in which the front housings 10 and 11 and the inner housing 20 are connected to each other is moved in a direction illustrated by an arrow S4 and is detached from the outer housing 30. Since the housing body M is detachably connected to the outer housing 30 by the protrusions 26 or 27, it can be easily detached.

After detaching the housing body M, the housing body M is rotated by 180 degrees around a central axis parallel to the longitudinal direction X and inverted along an arrow S5. Then, as illustrated in FIG. 13B, the inverted housing body M is moved in a direction illustrated by an arrow S6 and is inserted into the outer housing 30 again to be connected. As described above, the polarity can be easily changed from the first polarity to the second polarity in the optical connector 1.

In the optical connector 1 according to the present embodiment, as described above, the distal ends 40b of the latch 40 at which the engaging parts 43 and 44 are provided are configured to float to space apart from the front housings 10 and 11 in the normal state. Thus, a region corresponding to a distal end of a conventional latch can be reduced in size to achieve weight reduction of the optical connector. That is, a length of the latch 40 can be reduced. In addition to this, the optical connector 1 is configured such that the protrusions 53 and 54 positioned close to the front end 1a of the optical connector 1 with respect to the proximal end 40a of the latch 40 are provided on an inner side of the tab 50. When the engaging parts 43 and 44 of the latch 40 are engaged with the adaptor 100, the inner side of the latch 40 comes into contact with the protrusions 53 and 54 and the engaging parts 43 and 44 of the latch 40 are pushed down toward the front housings 10 and 11 with the protrusions 53 and 54 as respective fulcrums. According to this configuration, when the engaging parts 43 and 44 of the latch 40 are engaged with the adaptor 100, the latch 40 can be deformed toward the front housings 10 and 11 with the protrusions 53 and 54 positioned closer to the front end 1a of the optical connector 1 with respect to the proximal ends 40a as respective fulcrums, rather than deforming the latch 40 toward the front housings 10 and 11 with the proximal ends 40a as respective fulcrums. Since each deformation distance from each fulcrum decreases, an elastic force of the deformed latch 40 (engaging parts 43 and 44) increases, and a click feeling when the engaging parts 43 and 44 of the latch 40 are engaged with the adaptor 100 can be improved. As described above, according to the optical connector 1, it is possible to achieve weight reduction of the member and give a desired click feeling for the user when it is attached to the adaptor 100.

In the optical connector 1, the latch 40 and the outer housing 30 may be integrally formed. In this case, the number of parts of the optical connector 1 can be reduced to perform further weight reduction.

In the optical connector 1, the latch 40 includes the first inclined surfaces 41a and 42a that are inclined with respect to the longitudinal direction X on an inner side, and the first inclined surfaces 41a and 42a are spaced apart from the protrusions 53 and 54 in the normal state and come into contact with the protrusions 53 and 54 when the engaging parts 43 and 44 are engaged with the adaptor 100. Thus, it is possible to prevent the protrusions 53 and 54 from inhibiting the operation of the latch 40 when the optical connector 1 is pulled out from the adaptor 100.

In the optical connector 1, the latch 40 includes the recesses 41c and 42c that are recessed in the vertical direction perpendicular to the longitudinal direction and the second inclined surfaces 41b and 42b that form a part of the recesses 41c and 42c close to the rear end 1b on an outer side. The tab 50 includes the protrusions 51 and 52 protruding in the vertical direction on the front end 1a side. The protrusions 51 and 52 of the tab 50 are positioned in the recesses 41c and 42c in a state of being spaced apart from an outer surface of the latch 40 in the normal state, and move along the second inclined surfaces 41b and 42b to push down the engaging parts 43 and 44 of the latch 40 toward the front housings 10 and 11 in the vertical direction when the tab 50 moves in the longitudinal direction X from the front end 1a to the rear end 1b. Thus, the operation at the time of pulling out the optical connector 1 from the adaptor 100 can be made smooth.

In the optical connector 1, a plate thickness of the latch 40 at the proximal end 40a may be thinner than a plate thickness of the latch 40 at a region in which the first inclined surfaces 41a and 42a or the second inclined surfaces 41b and 42b are positioned. In this case, the operation of the latch 40 with the proximal end 40a as a fulcrum is made smooth, the operation when the optical connector 1 is pulled out from the adaptor 100 can be made smooth.

In the optical connector 1, the housing body M is configured to include the pair of front housings 10 and 11 respectively having the ferrules 14 and 15, and the inner housing 20 that is connected to the rear ends of the pair of front housings 10 and 11 and housed in the outer housing 30. The inner housing 20 is detachably connected to the outer housing 30. Thus, the housing body M can be detached from the outer housing 30.

In the optical connector 1, the housing body M may be configured to be rotatable around the central axis in the longitudinal direction X at a certain angle (for example, 180 degrees) with respect to the outer housing 30 so that a polarity of the pair of front housings 10 and 11 can be changed from the first polarity to the second polarity. Since a polarity of the optical connector 1 can be easily changed in this case, it is possible to make work of the user more efficient.

The optical connector 1 further includes the elastic member 70 provided between the outer housing 30 and the tab 50. The elastic member 70 is configured to return the tab 50 to a normal position when the tab 50 is moved toward the rear end 1b with respect to the outer housing 30. When the optical connector 1 is pulled out from the adaptor 100, the pulling-out work can be smoothly performed in this case, and work efficiency can be improved.

While the embodiments of the present disclosure have been described in detail above, the present disclosure is not limited to the above-described embodiments and can be applied to various embodiments. For example, in the above-described embodiment, an example of an optical connector that houses a pair of optical fibers has been described, but the present embodiment may be applied to an optical connector that houses one optical fiber, or the present embodiment may be applied to an optical connector that houses three or more optical fibers.

What is claimed is:

1. An optical connector including a front end and a rear end opposite to the front end in a first direction, the optical connector comprising:
   a housing body including at least one ferrule configured to hold an optical fiber therein, the housing body housing the ferrule so that a tip end of the ferrule is exposed at the front end of the optical connector;
   an outer housing connected to the housing body;
   a latch placed on an outer side of the outer housing and extending in the first direction from a proximal end having a connecting part with the outer housing toward the front end of the optical connector, the latch including at least one engaging part configured to engage with an external device at a distal end thereof, wherein the distal end of the latch floats to space apart from the housing body in a normal state; and
   a tab placed on an outer side of the latch to cover at least a part of the latch and connected to the outer housing to be movable in the first direction with respect to the outer housing, the tab being configured to push down the engaging part of the latch toward the housing body in a second direction intersecting the first direction according to movement of the tab in the first direction from the front end toward the rear end, wherein the tab includes at least one first protrusion disposed on an inner side of the tab between the front end of the connector and the proximal end of the latch,
   wherein the optical connector is configured to contact an inner side of the latch with the first protrusion to push down the engaging part toward the housing body with the first protrusion as a fulcrum when the engaging part of the latch is engaged with the external device.

2. The optical connector according to claim 1, wherein the latch and the outer housing are integrally formed.

3. The optical connector according to claim 1, wherein the latch includes a first inclined surface inclined with respect to the first direction on an inner side thereof, and the first inclined surface spaces apart from the first protrusion in the normal state and comes into contact with the first protrusion when the engaging part engages with the external device.

4. The optical connector according to claim 3, wherein a plate thickness of the latch at the proximal end is thinner than a plate thickness of the latch at a region in which the first inclined surface is positioned.

5. The optical connector according to claim 1,
   wherein the latch includes a recess recessed in the second direction and a second inclined surface forming a part of the recess close to the proximal end, on an outer side thereof,
   wherein the tab includes a second protrusion protruding in the second direction near the front end, and
   wherein the second protrusion is positioned in the recess in a state of being spaced apart from an outer surface of the latch in the normal state, and moves along the second inclined surface and pushes down the engaging part of the latch toward the housing body in the second direction when the tab moves in the first direction from the front end to the rear end.

6. The optical connector according to claim 5, wherein a plate thickness of the latch at the proximal end is thinner than a plate thickness of the latch at a region in which the second inclined surface is positioned.

7. The optical connector according to claim 1, wherein the housing body includes a pair of front housings each having the ferrule, and an inner housing connected to rear ends of the pair of front housings.

8. The optical connector according to claim 7, wherein the latch includes a pair of elongate members each corresponding to the respective front housings.

9. The optical connector according to claim 8, wherein each of the pair of elongate members includes the engaging part.

10. The optical connector according to claim 9, wherein the engaging part includes a pair of protrusions each protruding from each of the pair of elongate members toward outside thereof.

11. The optical connector according to claim 10, wherein the tab includes a pair of first protrusions protruding toward each other.

12. The optical connector according to claim 8, wherein each of the pair of elongate members includes a first inclined surface inclined with respect to the first direction on an inner side of the tab and a second inclined surface inclined with respect to the first direction on an outer side of the tab, and the first inclined surface spaces apart from the first protrusion in the normal state and comes into contact with the first protrusion when the engaging part engages with the external device.

13. The optical connector according to claim 1, wherein the tab includes a pair of slits, and the outer housing includes a pair of guide protrusions each disposed in the respective slits to guide the movement of the tab with respect to the outer housing along the first direction.

14. The optical connector according to claim 1, wherein the housing body includes:
- a pair of front housings each having the ferrule; and
- an inner housing connected to rear ends of the pair of front housings and housed in the outer housing, the inner housing being detachably connected to the outer housing.

15. The optical connector according to claim 14, wherein the housing body is configured to be rotatable around a central axis in the first direction at a predetermined angle with respect to the outer housing so that a polarity of the pair of front housings is changed from a first polarity to a second polarity.

16. The optical connector according to claim 1, further comprising:
- an elastic member disposed between the outer housing and the tab, the elastic member returning the tab to the normal state when the tab is moved toward the rear end with respect to the outer housing.

17. The optical connector according to claim 16, wherein the outer housing includes a pair of walls defining a space to house the elastic member therein.

* * * * *